(12) United States Patent
Schlonski et al.

(10) Patent No.: US 7,228,365 B2
(45) Date of Patent: Jun. 5, 2007

(54) SYSTEM FOR DETERMINING COMMUNICATION PARAMETERS ASSOCIATED WITH AN UNKNOWN DIGITAL PRINTER

(75) Inventors: Steven T. Schlonski, Webster, NY (US); Matthew DeRoller, Webster, NY (US); Krishna Kumar, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 659 days.

(21) Appl. No.: 10/762,670

(22) Filed: Jan. 22, 2004

(65) Prior Publication Data

US 2004/0160631 A1 Aug. 19, 2004

Related U.S. Application Data

(60) Provisional application No. 60/448,303, filed on Feb. 14, 2003.

(51) Int. Cl.
*G06F 3/00* (2006.01)
*G06F 13/12* (2006.01)

(52) U.S. Cl. ............. 710/15; 710/16; 710/17; 710/18; 710/19; 710/62; 710/72

(58) Field of Classification Search ............. None
See application file for complete search history.

(56) References Cited

U.S. PATENT DOCUMENTS

| 6,496,859 | B2 | 12/2002 | Roy et al. ............ 709/223 |
| 6,795,846 | B1 * | 9/2004 | Merriam ............ 709/203 |
| 2002/0196463 | A1 | 12/2002 | Schlonski et al. ....... 358/1.15 |
| 2003/0016376 | A1 * | 1/2003 | Narushima ............ 358/1.13 |
| 2003/0174360 | A1 * | 9/2003 | Ohshima ............ 358/1.15 |
| 2005/0248803 | A1 * | 11/2005 | Ohara ............ 358/1.15 |

* cited by examiner

*Primary Examiner*—Alan S. Chen
(74) *Attorney, Agent, or Firm*—R. Hutter

(57) ABSTRACT

A port monitor allows a computer, digital camera, or other device to send a print job to a target printer, where the only known information about the printer is its network address. Communication is attempted to the network address, sequentially using each of a plurality of port numbers. If none of the plurality of port numbers is successful in initiating communication to the network address, communication to the network address is attempted using an LPR port number, sequentially using each of a plurality of LPR queue names.

6 Claims, 3 Drawing Sheets

SYSTEM FOR DETERMINING COMMUNICATION PARAMETERS ASSOCIATED WITH AN UNKNOWN DIGITAL PRINTER

CLAIM OF PRIORITY TO PROVISIONAL APPLICATION

This application claims the benefit of U.S. Provisional Application No. 60/448,303, filed Feb. 14, 2003, the disclosure of which is totally incorporated herein by reference.

INCORPORATION BY REFERENCE

The following U.S. Published Patent Application is hereby incorporated by reference for the teachings therein: 20020196463, which is based on U.S. patent application Ser. No. 10/106,140, filed Mar. 25, 2002.

TECHNICAL FIELD

The present invention relates to digital printing over a network, particularly in the communication between a computer having a job to be printed and a target printer.

BACKGROUND

The basic model of digital printing over a network is well known. A population of computers, each of which may hold document data which is desired to be printed, communicates with a population of digital printers, using a print protocol such as Raw or LPR (Line Printer Request) over TCP/IP. An IP network address of a "target printer" on which the document data in the computer is desired to be printed is used by one computer to identify, and initiate communication with, the target printer. Once contact is made, Raw or LPR protocol is used to submit the document data.

In a practical network context, where a computer on a network is desired to send a set of data to be printed (herein, a "document") to a desired target printer, other parameters, "settings," must be determined and taken into account. First, even if the IP address of the target printer is determined, it must further be known what the "printer port" of the printer is. Printer port is a TCP/IP port on which the digital printer accepts print requests or documents. The printer port can be classified into two categories, ones that support Raw print job submission and the ones that support LPR submission. Raw printer port accepts print jobs using the standard TCP/IP communication commands, whereas LPR defines a set of commands which have to executed to submit the print job. Different printer vendors have different "printer port" numbers for their machines: common Raw printer port numbers are 9100, 2000, or 2105. In case of LPR, the port number is 515, as is common in legacy UNIX® printing applications. With LPR, there must further be submitted what is called a "queue name," which enables a type of handshake between the computer and the target printer. The queue name identifies the print channel/queue to be used by the printer; an incorrect value will lead to failure of the document submission.

In a typical network environment such as managed corporate intranet, all of the computers and printers on the network are managed with a network server. The network server typically retains, and regularly updates, a network directory of all printers and related devices directly accessible to it. The network directory retains, for each printer, information about the other necessary parameters, such as port numbers, print protocol (Raw/LPR) and other settings (e.g., queue name in case of LPR), so that any computer on the network can use this information when submitting a document thereto.

With the emergence of sophisticated portable computers and computer-like devices, such as lap-tops, personal data assistants, digital cameras, wireless telephones, pagers, etc. (hereinafter generically called "computers"), it is becoming common that a human user may wish to print a document on a printer which is located in an unfamiliar building to which he has brought his computer. Ordinarily, such a human user would have to ask the local system administrator to let him get on the local network, and in turn receive the necessary parameters or settings for printing on a selected printer in the building.

DESCRIPTION OF THE PRIOR ART

U.S. Pat. No. 6,496,859 discloses an example procedure for communication among computers and printers on a network.

Hewlett-Packard® (HP) currently markets a mobile printing system which can submit a document to a printer, given only a network address. However, the system is limited to printer port number 9100 Raw printing, which is a standard on all the HP printer models.

SUMMARY OF THE INVENTION

There is provided a method of communicating between a computer and a digital printer having a network address associated therewith. Communication is attempted to the network address, sequentially using each of a plurality of port numbers. If none of the plurality of port numbers is successful in initiating communication to the network address, communication to the network address is attempted using an LPR port number, sequentially using each of a plurality of LPR queue names.

There is further provided a computer suitable for communicating with a digital printer having a network address associated therewith, comprising: means for attempting communication to the network address, sequentially using each of a plurality of port numbers; and means for attempting communication to the network address using an LPR port number, sequentially using each of a plurality of LPR queue names.

DETAILED DESCRIPTION

Figure 1:
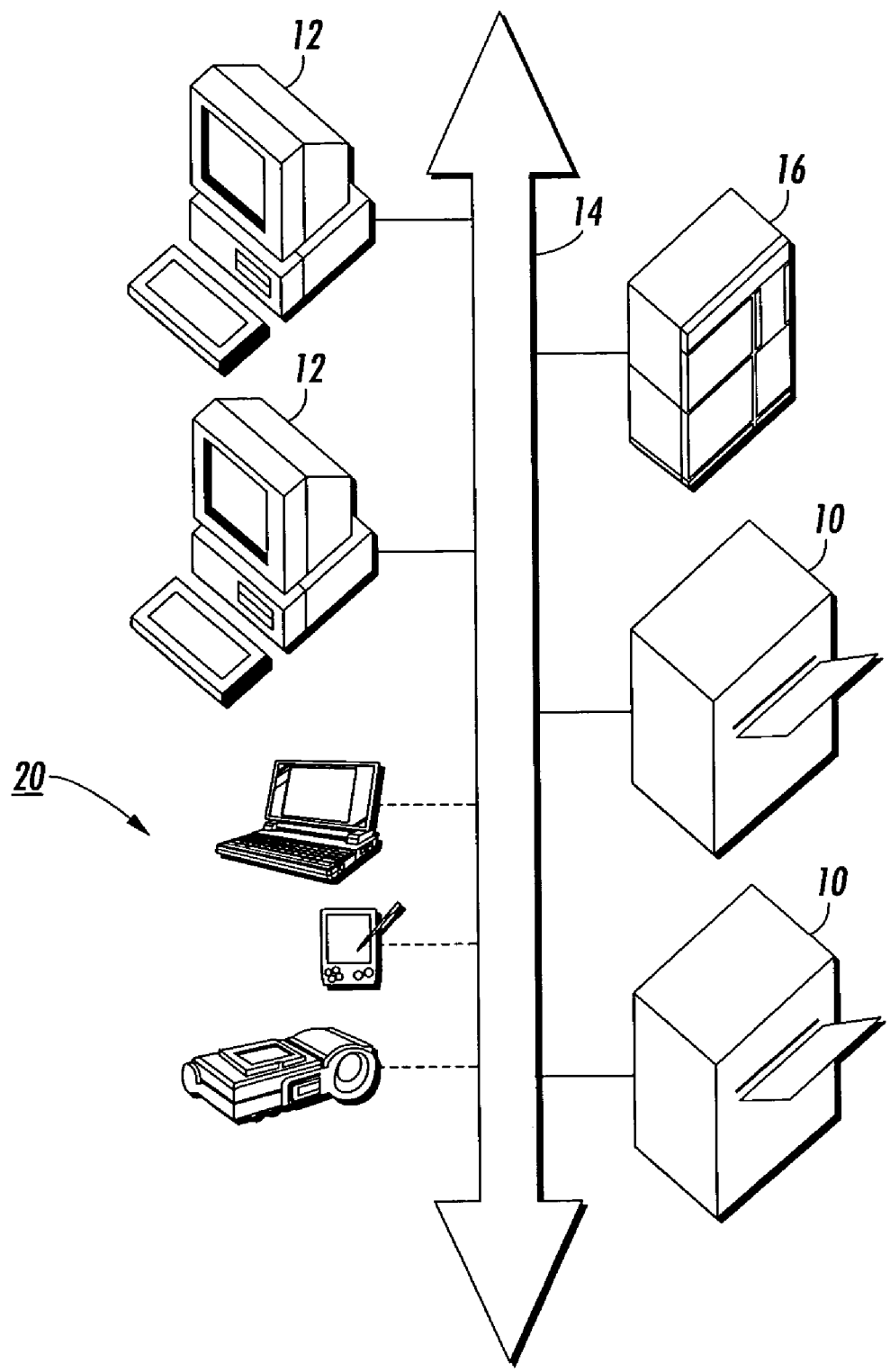
FIG. 1 is a simplified diagram showing a context of network printing.

FIG. 1 is a simplified diagram showing a context of network printing, as generally familiar in the prior art. As is familiar in the art, in a typical office building, any number of digital printers, such as 10, can receive image data from one of any number of computers, such as 12, via a network 14, which is typically controlled by a network server 16. Typically, each user of a computer 12 can choose, through a user interface, which digital printer he would like to print a particular job with. The network server 16 retains the internet address and other settings associated with each computer 12 and printer 10, so that, as needed, any computer 12 can "find" and operate a desired printer 10.

Also shown in FIG. 1 is any number of what generically be called "portable computers" such as digital cameras, laptop or tablet computer,PDA's, and other devices, known now or which will be developed in the future, which are capable of sending out data desired to be printed; these types of computers are shown generally as 20. In either case of a standard computer 12 or portable computer 20, the connection to the network (and ultimately to a printer 10) may be wireless, according to wireless technology available now or which will be developed in the future. As portable computers and computer-like devices become common, it will become desirable that a person bringing a portable computer into a "strange" building may wish to send a job from his computer to a desired printer 10. Because the portable computer 20 is not known to the network server 16, it is not straightforward for the portable computer to obtain the necessary settings for a desired printer, so that the job can be sent to the printer.

Figure 2:
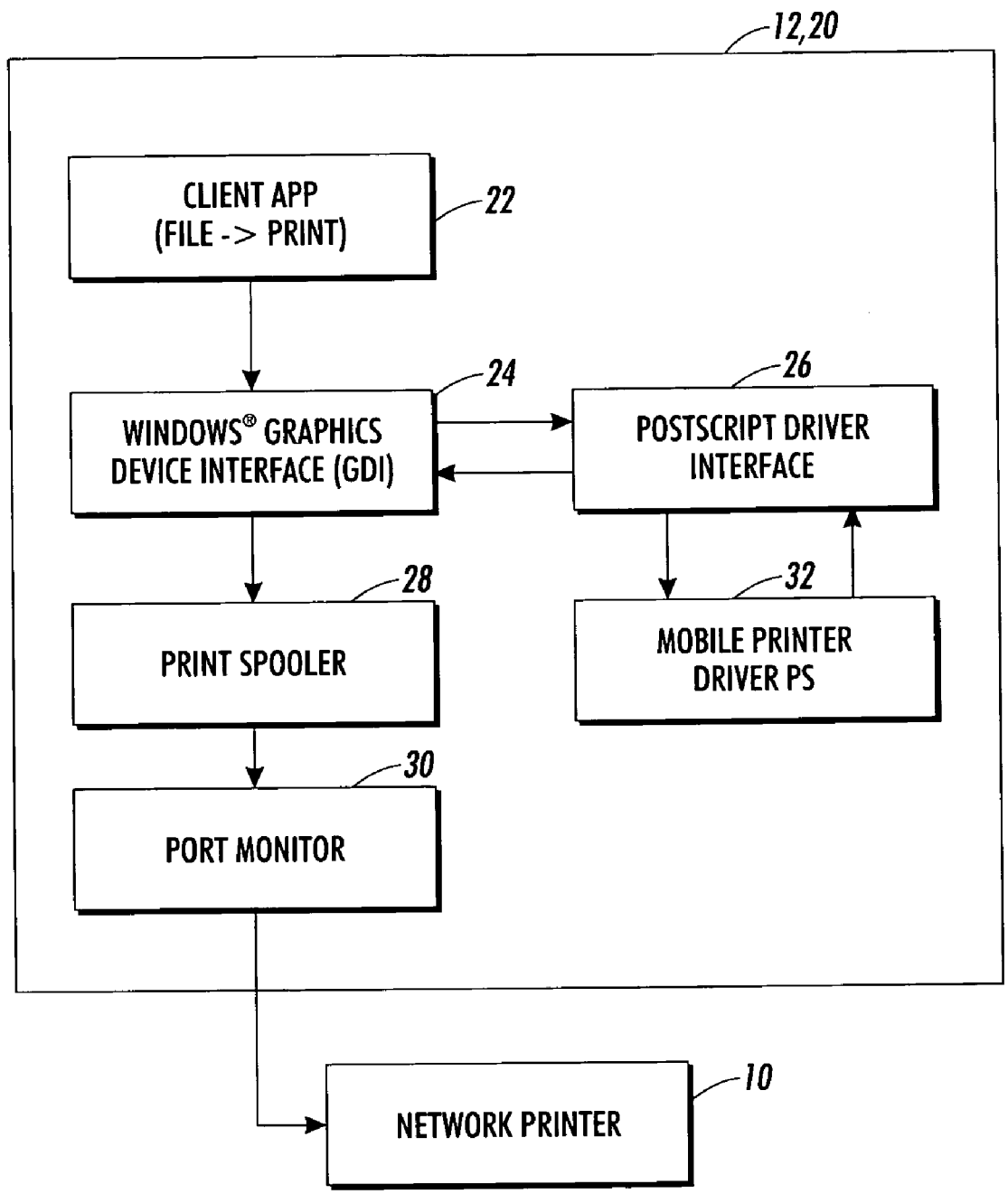
FIG. 2 is a diagram showing the use of a "port monitor" resident on a computer.

FIG. 2 is a diagram showing the use of a "port monitor" resident on a computer such as 12 or 20. The port monitor can reside on any computer, so that, even if the computer is moved to another building, the functions of the port monitor can be activated as needed. In the Figure, certain elements are familiar in any digital printing context, such as the client application 22; a Windows® Graphics Device Interface (GDI) 24, which interacts with, for example, a driver interface 26, such as for Adobe® PostScript®; and a print spooler 28. In addition to these elements, there is provided a "port monitor" 30, which in effect resides between the print spooler 28 immediately adjacent a port (once again, either standard or wireless) to a target printer 10. There is also provided a specially modified "mobile printer driver" 32, which interacts with the driver interface 26. The driver interface 26 converts the document submitted by the client application 22 into a format which is understood by the target printer, such as Adobe® PostScript®.

Figure 3:
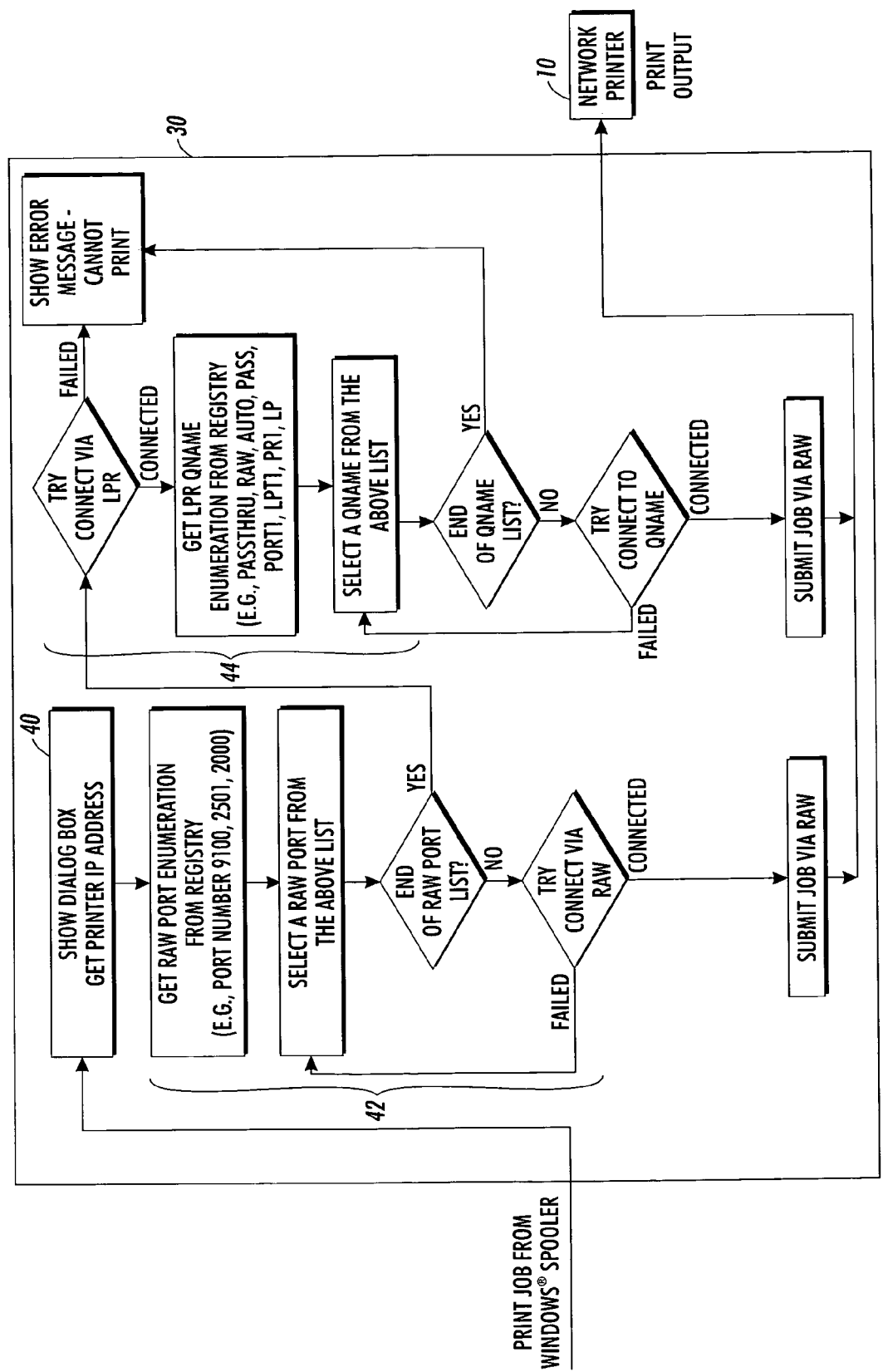
FIG. 3 is a flowchart showing the function of a "port monitor".

FIG. 3 is a flow-chart showing the functionality of the port monitor 30. The overall function of the port monitor 30 is to take the bare internet address of a target printer and determine the necessary parameters or "settings" for successfully connecting to and submitting a job to the otherwise unknown printer.

As shown in FIG. 3, when the port monitor is activated to determine the settings of a printer, the port monitor performs two major tests: first, the internet or other network address of the target printer is determined, at step 40. The internet address can be entered by manual entry or other importation into computer 12 or 20; or, the address of a printer of interest can be discovered through a discovery process, such as described by the Published patent Application incorporated by reference above. Once the internet address is thus determined, the port monitor attempts to contact the target printer using a set of established port numbers consistent with "raw" submission of image data, as shown by the loop indicated by 42. Such raw port numbers in common use include 9100, 2501, or 2000. These common port numbers are retained in a registry in memory on the computer, and can be updated as new port numbers come into use. Each port number in the registry is used to attempt connection with the target printer.

If all of the "raw" port numbers in the registry are tried without successful connection to the internet address of the target printer, an attempt is made to connect to the target printer using a "Line Printer Request" or LPR context, as shown by the loop marked 44. First, a connection with port number 515 on the target printer is established: this port number is consistent with the LPR context. In the LPR context, there is required a correct "queue name," (QNAME in FIG. 3) to be entered for successful connection: examples of such "queue names" are PASSTHRU, AUTO, RAW, etc. As shown by loop 44, each of a plurality of possible queue names is taken from a registry and applied to the internet address of the target printer until a successful connection is made.

A practical advantage of the port monitor is that its functionality can reside with a portable computer or similar device, such as a digital camera or other device as mentioned above, so that a human user carrying such a device can readily send documents to printers which are located in unfamiliar places, such as customer sites, airports, and stores. It will be noted that no modification of the target printer itself need be made to carry out the described method.

The invention claimed is:

1. A computer suitable for communicating with a digital printer having a network address associated therewith, comprising:
   means for attempting communication to the network address, sequentially using each of a plurality of port numbers; and
   means for attempting communication to the network address using an LPR port number, sequentially using each of a plurality of LPR queue names.

2. The computer of claim 1, further comprising
   means for invoking the means for attempting communication to the network address using an LPR port number if none of the plurality of port numbers is successful In initiating communication to the network address.

3. The computer of claim 1, further comprising
   means for determining the network address of the digital printer.

4. The computer of claim 1, the determining means including means for entering the network address of the digital printer.

5. The computer of claim 1, the determining means including means for discovering the network address of the digital printer.

6. The computer of claim 1, further comprising a digital camera.

* * * * *